United States Patent Office 3,642,746
Patented Feb. 15, 1972

3,642,746
PROCESS FOR THE POLYMERIZATION AND/OR COPOLYMERIZATION OF OLEFINS WITH THE USE OF ZIEGLER-TYPE CATALYSTS SUPPORTED ON CARRIER
Norio Kashiwa and Tadaichi Tokuzumi, Otake-shi, and Hiroshi Fujimura, Iwakuni-shi, Japan, assignors to Mitsui Petrochemical Industries, Ltd., Tokyo, Japan
No Drawing. Filed July 25, 1969, Ser. No. 845,031
Claims priority, application Japan, Aug. 1, 1968, 43/53,933; Aug. 5, 1968, 43/54,963; Dec. 30, 1968, 44/96,490
Int. Cl. C08f 1/56, 3/02
U.S. Cl. 260—88.2                        12 Claims

ABSTRACT OF THE DISCLOSURE

A process for polymerizing and/or copolymerizing olefins by using an improved catalyst consisting of a transition metal compound supported on electrondonor-pretreated inorganic solid particles the transition metal compound being a component of a Ziegler-type catalyst, and an organometallic compound, whereby the polymerization activity of the catalyst per unit weight both of the transition metal and organometallic component remarkably increases, thus making it possible to reduce an amount of a carrier which remains in the resultant polymer causing increased ash content, and also possible to easily control the melt-index of the resultant polymer.

---

This invention relates to a process for polymerizing or copolymerizing olefins by using an improved catalyst consisting of a transition metal compound supported on inorganic solid particles, the transition metal compound being a component of a Ziegler-type catalyst, and an organometallic compound, whereby the polymerization activity of the catalyst per unit weight both of the transition metal and of the carrier-supported catalyst component remarkably increases, thus making it possible to reduce the amount of carrier which remains in the resultant polymer and causes a high ash content, and also easily control the melt-index of the resultant polymer. More particularly, the invention relates to a process for polymerizing or copolymerizing olefins in the presence of a catalyst comprising Ziegler-type catalyst components supported on inorganic solid particles, which process comprises polymerizing or copolymerizing olefins in the presence of a catalyst comprising (1) a transition metal compound supported on inorganic solid particles, obtained by pre-treating solid particles of a dihalide of a divalent metal selected from the group consisting of magnesium, calcium, zinc, chromium, manganese, iron, cobalt and nickel with an electron donor selected from the group consisting of aliphatic carboxylic acids, aromatic carboxylic acids, alkyl esters of aliphatic carboxylic acids, alkyl esters of aromatic carboxylic acids, aliphatic ethers, cyclic ethers, aliphatic ketones, aromatic ketones, aliphatic aldehydes, aliphatic alcohols, aromatic alcohols, aliphatic acid halides, aliphatic nitriles, aromatic nitriles, aliphatic amines, aromatic amines, aliphatic phosphines and aromatic phosphines which is liquid or gaseous under the pre-treating conditions, in the substantial absence of water, and then heating said pre-treated solid particles together with a halogen compound of a transition metal selected from the group consisting of tetravalent titanium, tetravalent vanadium and pentavalent vanadium metal which is liquid under the heat-treatment conditions to thereby bond said halogen compound to the surfaces of said pre-treated solid particles; and, (2) an organometallic compound selected from the group consisting of organoaluminum compounds and alkyl zinc.

Ziegler-type catalysts for polymerizing olefins which consist of transition metal halogen compounds and organometallic compounds are generally known. There has, however, been a tendency that the catalyst components are agglomerated in the polymerization system and as a result, only the surface of the agglomerated mass acts as the catalyst and those particles inside the mass are consumed uselessly. Various proposals have therefore been made to prevent the agglomeration of the catalyst particles by supporting them on a carrier and to use the catalyst effectively.

As such proposals, the use of a Ziegler-type catalyst bonded to the surfaces of finely divided particles of a carrier has been known (for instance, British Pat. 841,822, British Pat. 1,024,336, Belgian Pat. 705,220, and U.S. Pat. 3,166,542). Since, however, residue of a solid matter in the resulting polyolefin is undesirable for some applications, there has been a demand for catalysts wherein the carrier can be easily removed from the resultant polyolfin after the completion of the polymerization. In the regard, there was a proposal in U.S. Pat. 3,288,720 corresponding to British Pat. 927,969 in which a compound soluble in water or alcohol is used as a carrier, and after the completion of polymerization, it is removed by washing with water or alcohol.

According to this proposal, a catalyst is used for the gaseous phase polymerization of olefins prepared by reacting an organometallic compound impregnated into a carrier with a transition metal compound, and combining the reaction product with an organometallic compound. The patent discloses, for instance, calcium carbonate, calcium chloride, or sodium chloride as a preferred carrier. The catalyst prepared by this method, however, does not have outstanding high activity of polymerizing olefins, and has a drawback that it requires a greater quantity of the carrier. As a result, much ash content attributable to the carrier remains in the resultant polyolefin unless it is treated with water or alcohol after completion of the polymerization reaction, and such ash content gives adverse effects to the properties of the polymer. For instance, it is likely that shaped articles made from the polymer will undergo occurrence of fish eyes, yarn breakage, coloration, or undesirable interaction with an additive (such as stabilizer, mold-releasing agent, and coloring agent), and such defects constitute substantial restrictions on the use of the polymer. For minimizing such restrictions, the polymer produced according to this proposal must be subjected to complicated and disadvantageous post-treatments to remove the carrier.

We attempted at developing a polymerization catalyst system which is rendered very highly active in polymerization by using a carrier and in which the amounts of the catalyst and carrier are small enough to require no post-treatment of the resulting polymer and if desired, the carrier can be easily removed by a simple treatment with water or alcohol. It has now been found to our surprise that a polymerization catalyst having an exceedingly improved activity per unit weight both of the carrier-supported catalyst and of transition metal can be obtained by pre-treating solid particles of a dihalide of a divalent metal selected from the group consisting of magnesium, calcium, zinc, chromium, manganese, iron, cobalt and nickel with an electron donor which is liquid or gaseous under the pre-treating conditions, in the substantial absence of water, and bonding a transition metal halogen compound, which is a component of a Ziegler-type catalyst, to said pre-treated particles.

As the inorganic material, magnesium dihalides and manganese dihalides, but magnesium dichloride and manganese dichloride are preferred. It has also been found that the improvements contemplated by this invention cannot be obtained with a mere conjoint use of a Ziegler-type catalyst and an electron donor without a carrier, but also with the use of a catalyst obtained by supporting a Ziegler-type catalyst on a metal halide in the presence of an electron donor without prior treatment of the metal halide, or with the conjoint use of a small amount of an electron donor and a conventional carrier-supported catalyst without prior electron donor treatment. We have also found that a considerably wide variety of compounds can be used as the electron donor to be used in the pre-treating of a carrier according to the invention, and the process is commercially very advantageous in this respect, too.

Accordingly, an object of this invention is to provide a process for the preparation of polyolefins using a Ziegler-type catalyst supported on a dihalide of a divalent metal as a carrier which has an improved polymerization activity per unit weight of the supported catalyst over conventional supported catalysts of this kind and therefore reduces the ash content of the resulting polymer attributable to the carrier.

Many other objects and advantages of the invention will become more apparent from the following description.

The transition metal halogen compounds, organoaluminum compounds or dialkyl zinc used as the catalyst in the invention are known per se as the components of Ziegler-type catalysts.

The dihalides of divalent metals used as the carrier of the transition metal halogen compounds are insoluble or sparingly soluble in inert solvents used in the polymerization reaction of olefins, are readily soluble in water, and do not adversely affect the polymerization catalysts. Specifically, they are a dihalide, preferably a chloride, bromide or iodide, of a divalent metal selected from the group consisting of magnesium, calcium, zinc, chromium, manganese, iron, cobalt and nickel. Such carriers are used in the form of anhydride commercially available, or when they contain water of crystallization, they may be used after heating in a stream of a halogen corresponding to the respective dihalide.

The particle size of the metal halide used as carrier in the invention may be, for instance, in the range of 0.05 to 70 microns, preferably above 0.1 micron but not exceeding 30 microns, particularly preferably 0.1 to 20 microns. The use of a carrier containing at least 80% by weight of particles with a size in the above-specified range is recommended.

Various mechanical pulverizing means already known in the art may be used to produce particles of the carriers used in the process of the invention. For the production of particles having an average particle size of less than 1 micron, it is rather advisable to prepare a solution of the carrier compound, e.g. prepare a solution in an alcohol of anhydrous magnesium or manganese halide, and mix the solution with an organic precipitant incapable of dissolving such halide, such as hydrocarbons or halogenated hydrocarbons to thereby reprecipitate it as fine particles. As such alcohol, lower aliphatic alcohols such as methanol, ethanol, propanol, butanol, hexanol and n-octanol can be exemplified; the examples of such hydrocarbons are pentane, heptane, kerosene, benzene, toluene, and xylene; and examples of the halogenated hydrocarbons are carbon tetrachloride, chloroform, dichloroethane, chlorobenzene, bromobenzene and chlorotoluene.

The average particle size of carrier particles prepared by this procedure usually reaches 0.1 to 1 micron, a size difficult to obtain by the ordinary mechanical pulverizing means.

For pre-treating the anhydrous metal halide with the electron donor in the invention, any means can be employed which is capable of bringing the metal halide into contact with the electron donor which is either liquid or gaseous under the treating conditions, in the substantial absence of water. For instance, the electron donor which is liquid or gaseous at the pre-treating temperatures and pressures can either be directly contacted with the particles of the metal halide, or can be contacted with the particles suspended in an organic medium such as hexane, kerosene, or benzene. According to another pre-treating method, an electron donor which is solid at the pre-treating temperatures and pressures is dissolved into an organic liquid medium capable of dissolving the electron donor, and then contacted with an anhydrous metal halide. Accordingly, the pre-treatment with an electron donor which is liquid or gaseous under the pre-treating conditions, as used in the present invention, also includes the above-mentioned embodiments.

Preferably, the pre-treating temperature is not higher than the thermal decomposition temperature of the dihalide of the divalent metal. A suitable temperature can usually be selected within the range of $-50°$ to $+300°$ C., preferably room temperature to 200° C., and more preferably 40° to 150° C. The pre-treating time may be one which will provide a sufficient contact between the anhydrous metal halide and the electron donor, and is not particularly restricted. Usually, it is from 5 minutes to 5 hours depending upon such factors as the contacting means and the electron donor used. A long time contact is not necessary, although it is not disadvantageous.

It is not known how the electron donor coordinated, or presumed to be coordinated, with the carrier acts in the fixing of a transition metal halogen compound to form a highly active, supported catalyst. But the following conjecture may hold good. In view of the fact that the results intended by the present invention can hardly be achieved, as will be shown later in the examples and comparative examples, when the polymerization of olefins is conducted (1) by using a catalyst component prepared by reacting a non-pretreated carrier with a transition metal halogen compound, (2) by using a catalyst component prepared by reacting a carrier with a transition metal halogen compound in the mere presence of an electron donor, or (3) by using, in the presence of an electron donor, a catalyst component prepared by reacting a transition metal halogen compound with a carrier which is not pre-treated with an electron donor, it is presumed that an interaction occurs among the metal halide particles, electron donor and transition metal halogen compound. In the case of an ester as the electron donor, the presence of a coordination bond between the electron donor and the carrier is confirmed from the fact that there is a shift in the position of the characteristic absorption band in the infrared spectrum.

The electron donor used in the invention is liquid or gaseous under the pre-treating conditions (including cases where it is capable of becoming liquid or gaseous), and is selected from the group consisting of aromatic carboxylic acids, aliphatic carboxylic acids, alkyl esters of aliphatic carboxylic acids, alkyl esters of aromatic carboxylic acids, aliphatic ethers, cyclic ethers, aliphatic ketones, aromatic ketones, aliphatic aldehydes, aliphatic alcohols, aromatic alcohols, aliphatic acid halides, aliphatic nitriles, aromatic nitriles, aliphatic amines, aromatic amines, aliphatic phosphines and aromatic phosphines. Among these electron donors, $C_1-C_{12}$ saturated or unsaturated aliphatic alcohols, particularly monohydric or polyhydric aliphatic alcohols, $C_7-C_9$ aromatic alcohols; alkyl esters of $C_1-C_{13}$ saturated or unsaturated aliphatic carboxylic acids which may have a substituent, especially a halogen atom, and $C_1-C_{12}$ saturated or unsaturated aliphatic alcohols, particularly monohydric or dihydric aliphatic alcohols; alkyl esters of aromatic carboxylic acids between $C_6-C_{12}$ aromatic carboxylic acids, especially $C_7-C_8$ monovalent or divalent aromatic carboxylic acids, which may have a substituent, especially a lower alkyl group, and $C_1-C_{12}$ saturated or unsaturated aliphatic alcohols, especially monohydric or dihydric aliphatic alcohols; $C_1$–$C_{15}$, especially $C_1$–$C_{13}$, saturated or unsaturated aliphatic carboxylic acids; $C_7$–$C_{12}$ aromatic carboxylic acids which may have a substituent attached to the aromatic nucleus, especially $C_7$–$C_8$ monovalent or divalent aromatic carboxylic acids which may have a lower alkyl group as a substituent; and, pyridines which may have a substituent, especially one selected from lower alkyl groups and vinyl groups, attached to the nuclear carbon are preferred. As the aliphatic ethers, $C_2$–$C_{12}$, preferably $C_3$–$C_4$ aliphatic ethers; as the cyclic ethers, $C_3$–$C_4$ cyclic ethers, preferably $C_4$ cyclic mono- or di-ether; as the aliphatic ketones, $C_3$–$C_{13}$, preferably $C_3$–$C_4$, aliphatic ketones; as the aromatic aldehydes, $C_7$–$C_{12}$ aromatic aldehydes, preferably benzaldehyde; as the aliphatic nitriles, $C_2$–$C_{12}$ aliphatic nitriles, preferably acetonitrile; as the aliphatic amines, $C_1$–$C_{20}$, preferably $C_1$–$C_{16}$, aliphatic amines; and as the aromatic amines, $C_6$–$C_{12}$, preferably $C_6$–$C_8$, aromatic amines are cited. Specific examples of these electron donors are aliphatic carboxylic acids such as acetic acid, propionic acid, valeric acid and acrylic acid; aromatic carboxylic acids such as benzoic acid and phthalic acid; aliphatic carboxylic acid esters such as methyl formate, dodecyl formate, ethyl acetate, butyl acetate, vinyl acetate, methyl acrylate, octyl lactoate, ethyl laurate and octyl laurate; aromatic carboxylic acid esters such as methyl benzoate, ethyl benzoate, octyl paraoxybenzoate and dioctyl phthalate; aliphatic ethers such as ethyl ether, hexyl ether, allylbutyl ether and methyl undecyl ether; cyclic ethers such as tetrahydrofuran, dioxane and trioxane; aliphatic amines such as methyl amine, diethyl amine, tributyl amine, octyl amine and dodecyl amine; aromatic amines such as pyridine, aniline and naphthyl amine; aliphatic ketones such as acetone, methyl isobutyl ketone, ethyl butyl ketone and dihexyl ketone; aromatic ketones such as acetophenone; aliphatic aldehydes such as propionaldehyde; aliphatic alcohols such as methanol, ethanol, isopropanol, hexanol, 2-ethyl hexanol, octanol and dodecanol, aromatic alcohols such as benzyl alcohol and methyl benzyl alcohol; aliphatic nitriles such as acetonitrile, valeronitrile and acrylonitrile; aromatic nitrile such as benzonitrile and phthalonitrile; aliphatic acid amides such as acetamide; and phosphines such as triethyl phosphine and triphenyl phosphine.

The pre-treated solid particles are heat-treated together with a halogen compound of a transition metal selected from the group consisting of tetravalent titanium metal, tetravalent vanadium metal and pentavalent vanadium metal, which is liquid under the heat-treatment conditions to thereby bond the halogen compound to the surfaces of the solid particles. This fixing of the halogen compound to the surfaces of the pre-treated solid particles may be effected in a manner similar to previous proposals. For instance, this can be effected by heating the pre-treated metal halide particles together with the transition metal halogen compound.

Specific examples of the titanium or vanadium halogen compounds which are liquid under the treating conditions are halogen compounds of tetravalent titanium such as titanium tetrachloride, titanium tetrabromide, titanium ethoxy trichloride, titanium diethoxy dichloride and titanium dibutoxy dichloride; halogen compounds of tetravalent vanadium such as vanadium tetrachloride; and halogen compounds of pentavalent vanadium such as vanadium oxytrichloride. Preferably, halogen compounds of tetravalent titanium, particularly titanium tetrachloride, are used.

For supporting the transition metal halogen compound on the pre-treated particles of the divalent meal dihalide, they are heat-treated in contact with each other at a temperature of 30 to 300° C., preferably 70 to 140° C. This treatment is performed in an inert gas atmosphere free from oxygen and water. After contacting the transition metal halogen compound with the pre-treated particles of the divalent metal dihalide at the predetermined temperature and for the predetermined time, a large excess of the transition metal halogen compound is removed by filtration or decantation, preferably followed by washing with a fresh transition metal halogen compound. Subsequently, washing with a suitable inert solvent such as hexane, heptane or kerosene is effected to remove free transition metal halogen compound not supported on the metal halide.

In the supporting procedure, if the halogen compound is liquid, particles of the divalent metal dihalide are immersed in the halogen compound to effect contact between them. If desired, the halogen compound may be repeatedly contacted with the carrier by putting the carrier into an extracting tube such as a Soxhlet extractor, and refluxing the halogen compound through the tube.

In the supporting of the transition metal halogen compound on the pre-treated divalent metal dihalide according to the invention, it is not preferable to use the transition metal halogen compound in a form diluted with a solvent capable of dissolving it. If, for instance, a saturated hydrocarbon is used as the diluting solvent, a complex formed by the interaction of the transition metal halogen compound and the electron donor, only sparingly soluble in the hydrocarbon, is likely to envelop the surface of the metal halide, and make it impossible to prepare an effective catalyst.

When the transition metal halogen compound supported on the divalent metal dihalide pre-treated with the electron donor is used as a catalyst component, it is made into a suspension in an inert solvent such as hexane, heptane or kerosene, or it is made into a solid powder by volatilizing the washing liquid in a dry inert gas stream or under reduced pressure.

The electron donor coordinated, or presumed to be coordinated, with the divalent metal dihalide by the pre-treatment according to the invention, when encountered with the transition metal halogen compound, reacts with it or forms a complex together with the transition metal halogen compound, and most of it comes off from the surface of the solid divalent metal dihalide to be dissolved in the transition metal halogen compound which is present in excess. Careful examination of the behavior of the electron donor by an infrared absorption spectrum indicates that after reaction with the transition metal halogen compound, it comes off from the solid divalent metal dihalide completely or mostly.

When a divalent metal dihalide having no electron donor coordinated therewith is washed with a solvent after reacted with the transition metal halogen compound, the transition metal halogen compound is not at all fixed thereon, or only a trace of the transition metal halogen compound considered to remain fixed owing to insufficient washing is detected. Such catalyst component exhibits no polymerization activity or gives only a minor amount of a polymer.

It is thus presumed that the electron donor serves as an agent for fixing the transition metal halogen compound on the divalent metal dihalide. Usually, when the transition metal halogen compound reacts with the divalent metal dihalide pre-treated with an electron donor, substantially all of the electron donor is taken off, and is not present in the final carrier-supported catalyst, or remains only in a negligible amount.

Generally, an electron donor of various kinds is added to an olefin polymerizing catalyst comprising a transition metal halogen compound and an organometallic compound for the purpose of promoting the polymerization activity, regulating the molecular weight distribution and also regulating the molecular weight. In the process of the invention, too, the electron donor which may remain in the metal halide owing to insufficient reaction or insufficient washing would exhibit almost the same effect. Hence, it is not necessary to remove the electron donor completely unless it is to be particularly avoided, and if desired, a suitable amount of the electron donor may be present in the final catalyst so as to achieve the above-mentioned objects.

The amount of the electron donor used in the invention to pre-treat the divalent metal dihalide is not particularly restricted, but it is preferable to use $6\text{--}10^{-2}$ mol or so of the electron donor coordinated or presumably coordinated with the divalent metal dihalide per mol of the divalent metal dihalide. The use of an excessive amount of the electron donor will only result in an unbeneficial reaction with the transition metal halogen compound to form, for instance, an alkoxide of titanium. When, therefore, excess electron donor is present, it is advisable to add excess transition metal halogen compound, or volatile free electron donor by heating and thereafter to support the transition metal halogen compound on the pre-treated carrier particles.

It is sufficient that the amount of the transition metal halogen compound to be supported onto the pre-treated particles of the divalent metal dihalide is about 0.01 mmol to 5 mmols per gram of the pre-treated divalent metal dihalide. If desired, up to 10 mmols of the halogen compound may be used.

According to the present invention, the polymerization of olefins is conducted by using a catalyst comprising the transition metal halogen compound fixed to the pre-treated divalent metal dihalide and an organometallic compound selected from the group consisting of organoaluminum compounds and alkyl zinc.

As these known organometallic compounds, organoaluminum compounds expressed by the general formulae $R_3Al$, $R_2AlX$, $RAlX_2$, $R_2AlOR$, $RAl(OR)X$ and $R_3Al_2X_3$ (wherein R is an alkyl or aryl group, and X is a halogen atom) and dialkyl zinc expressed by the general formula $R_2Zn$ (wherein R is an alkyl group) are cited. Specific examples of the preferable organometallic compounds are triethyl aluminum, tripropyl aluminum, tributyl aluminum, diethylaluminum chloride, diethyl aluminum bromide, diethylaluminum ethoxide, diethylaluminum phenoside, ethylaluminum ethoxychloride, ethylaluminum sesquichloride, diethyl zinc and dibutyl zinc.

According to the process of the invention, the polymerization and/or copolymerization of olefins is performed by using a particular type Ziegler catalyst comprising the transition metal halogen compound bonded by the heat-treatment to the surfaces of the solid particles of the divalent metal dihalide which are pre-treated with the electron donor, as hereinbefore described.

The olefins to be polymerized according to the present invention include known olefins polymerizable or copolymerizable with the Ziegler-type catalyst, such as ethylene, propylene and butene.

The concentration of the transition metal halogen compound supported on the carrier which is used in polymerizing olefins is preferably 0.005 to 10 g. per liter of the solvent used in the polymerization system, while the concentration of the organometallic compound is preferably 0.01 to 50 mmols on the same basis.

A mere combination of the transition metal halogen compound and the divalent metal dihalide treated or not treated with the electron donor exhibits no polymerization activity towards olefins. In the preparation of the catalyst according to the invention, it is necessary to add the organometallic compound to the transition metal halogen compound supported on the pre-treated metal halide or vice versa.

The polymerization reaction of olefins using the catalyst of the invention is carried out in the same manner as in the known polymerization reactions using the ordinary Ziegler-type catalyst.

These operations need to be performed in a substantially oxygen- and water-free condition. A suitable inert solvent such as hexane, heptane or kerosene is used. The catalyst of the invention is put into the solvent, and at least one olefin is fed thereinto to effect its polymerization. The polymerization temperature is 20 to 200° C., preferably 60 to 180° C., and the polymerization is preferably carried out under elevated pressure. The pressure ranges from atmospheric pressure to 100 kg./cm.$^2$, especially from 2 to 60 kg./cm.$^2$. In the polymerization of ethylene with the catalyst system of the invention, the molecular weight of the polymer can be controlled to some extent by varying the polymerization conditions, such as the polymerization temperature and the molar ratio of the catalyst. The addition of hydrogen to the polymerization system, however, is effective, and the use of a great quantity of hydrogen gives a waxy polymer.

The advantage of the invention is that polyolefins having a far higher melt index can be obtained than in the case of using a catalyst component prepared by supporting the transition metal halogen compound on the carrier without the use of the electron donor. Moreover, as compared with the catalyst system without a carrier, the catalyst system of the invention gives an increased yield of polyolefins per unit weight of the transition metal. In the case of the slurry polymerization, the resultant polymer has a very high bulk density, and therefore, the yield of the polymer per unit weight of the solvent increases. Furthermore, it becomes easy to discharge and transport the polymer. An additional advantage is that as the resultant polymer contains a very small amount of the transition metal compound, almost no practical disadvantage occurs in the shaped articles from the polymer even if the transition metal compound is not inactivated. When it is desired to remove the carrier, the polymer is treated with water or alcohol, as the divalent metal dihalide is soluble in water or alcohol.

The invention will further be described with reference to the following examples.

EXAMPLE 1

Commercially available anhydrous magnesium chloride was calcined in a steam of nitrogen at 300° C. for 6 hours. The infrared absorption spectrum of the heat-treated magnesium chloride did not indicate the presence of absorption bands based on water or crystallization or hydroxyl groups either. The magnesium chloride (9.5 g.) was added in a nitrogen atmosphere to a suspension of 10 mmols of absolute methanol in anhydrous hexane, and heat-treated for 30 minutes at 50° C., followed by drying under reduced pressure. The analysis thereof showed that this magnesium chloride has a composition $MgCl_2 \cdot \frac{1}{10}MeOH$ (Me is a methyl group). The infrared absorption spectrum of this compound clearly showed the presence of an absorption band of methanol, but there was no appreciable absorption band based on water of crystallization.

This magnesium chloride was suspended into titanium tetrachloride, and stirred at 125° C. for 1.5 hours. The reacted suspension was filtered while hot, and washed with refined hexane until there was no appreciable presence of chlorine in the washing liquid. (The foregoing operations were all performed in a nitrogen atmosphere.) The so prepared carrier-supported catalyst component contained a titanium chlorine compound which is equivalent to 12 mg. of titanium per gram of the carrier. The absorption band based on the methanol which had been observed before reaction with titanium tetrachloride completely disappeared after the reaction.

A 3-liter autoclave was charged with 1-liter of hexane as a polymerization solvent, and then with 200 mg. of the carrier-supported catalyst component and 3 mmols of triisobutyl aluminum, and was heated to 90° C. On addition of 3.5 kg./cm.$^2$ of hydrogen, ethylene gas was continuously fed and polymerized while the total pressure was being maintained at 7 kg./cm.$^2$. The two-hour polymerization yielded 280 g. of a white polyethylene having a bulk density of 0.3 and a molecular weight of 50,000. The yield corresponds to 1400 g. per gram of the carrier-supported catalyst component and 5600 g. per mmol of titanium.

COMPARATIVE EXAMPLE 1

Ethylene was polymerized in the same manner as in Example 1 except that a product from simultaneous addition of 0.6 g. of the methanol-containing magnesium chloride prepared in Example 1, 0.25 mmol of titanium tetrachloride and 3 mmols of triisobutyl aluminium was used as the catalyst. Some 46 g. of polyethylene having a molecular weight of 112,000 were obtained. The yield corresponds to only 184 g. per mmol of the titanium.

COMPARATIVE EXAMPLE 2

Commercially available anhydrous magnesium chloride was heated at 300° C. for 6 hours. The obtained magnesium chloride was heated together with titanium tetrachloride in the same manner as in Example 1, with the result that the chlorine compound of titanium equivalent to 0.2 mg. of titanium was supported per gram of the carrier.

Ethylene was polymerized for 2 hours at 90° C. in the same manner as in Example 1 using 200 mg. of the so obtained carrier-supported catalyst component and 3 mmols of triisobutyl aluminium. Polyethylene was obtained in 5 g. yield, which corresponds to 25 g. per gram of the carrier-supported catalyst component.

EXAMPLES 2 TO 27 AND COMPARATIVE EXAMPLE 3

Commercially available anhydrous magnesium halides were calcined for 3 hours at 600° C. in a nitrogen atmosphere. The heat-treated anhydrous magnesium halides were suspended into dry hexane in a nitrogen atmosphere, and while stirring at a high speed, stoichiometric amounts of absolute alcohols were added to form a magnesium halide containing the alcohol at various ratios as indicated in Table 1. The alcohol-containing magnesium halide was suspended in various transition metal halogen compounds indicated in Table 1 and stirred at 110° C. for 1.5 hours. The reacted suspension was filtered while being hot, and washed with refined hexane until there was no appreciable presence of halogen in the washing liquid, followed by drying. (All the foregoing operations were performed in a nitrogen atmosphere.) Ethylene was polymerized under the same conditions as in Example 1 except using 200 mg. of the carrier-supported catalyst component and 5 mmols of triisobutyl aluminum. The results are given in Table 1.

TABLE 1

| | Metal halide | Kind and mole of alcohol coordinated with one mole of MgCl$_2$ | Transition metal halogen compounds | | Yield of polyethylene (g.) |
|---|---|---|---|---|---|
| | | | Kind | Amount fixed (mg./g.) | |
| Example: | | | | | |
| 2 | MgCl$_2$ | CH$_3$OH | TiCl$_4$ | 16 | 273 |
| 3 | MgCl$_2$ | CH$_3$OH | TiBr$_4$ | 14 | 206 |
| 4 | MgCl$_2$ | CH$_3$OH | Ti(OEt)Cl$_3$ | 15 | 228 |
| 5 | MgCl$_2$ | CH$_3$OH | Ti(nBuO)$_2$Cl$_2$ | 19 | 207 |
| 6 | MgCl$_2$ | CH$_3$OH | VCl$_4$ | 21 | 138 |
| 7 | MgCl$_2$ | CH$_3$OH | VOCl$_3$ | 25 | 141 |
| 8 | MgCl$_2$ | 2CH$_3$OH | TiBr$_4$ | 21 | 297 |
| Comparative Example 3 | MgCl$_2$ | $\frac{1}{1000}$ C$_2$H$_5$OH | TiCl$_4$ | ¹0.2 | 4 |
| Example: | | | | | |
| 9 | MgCl$_2$ | $\frac{1}{100}$ C$_2$H$_5$OH | TiCl$_4$ | 2 | 210 |
| 10 | MgCl$_2$ | $\frac{1}{5}$ C$_2$H$_5$OH | TiCl$_4$ | 8 | 315 |
| 11 | MgCl$_2$ | C$_2$H$_5$OH | TiCl$_4$ | 24 | 293 |
| 12 | MgCl$_2$ | 6C$_2$H$_5$LH | TiCl$_4$ | 59 | 301 |
| 13 | MgCl$_2$ | CH$_2$=CHCH$_2$OH | TiCl$_4$ | 14 | 196 |
| 14 | MgCl$_2$ | CH$_2$=CHCH$_2$OH | VCl$_4$ | 18 | 142 |
| 15 | MgCl$_2$ | nC$_8$H$_{17}$OH | TiCl$_4$ | 16 | 254 |
| 16 | MgCl$_2$ | C$_6$H$_5$CH$_2$OH | VOCl$_3$ | 18 | 103 |
| 17 | MgCl$_2$ | nC$_{12}$H$_{25}$OH | TiCl$_4$ | 15 | 246 |
| 18 | MgCl$_2$ | nC$_{12}$H$_{25}$OH | TiBr$_4$ | 14 | 200 |
| 19 | MgBr$_2$ | $\frac{1}{5}$ CH$_3$OH | Ti(OEt)Cl$_3$ | 8 | 171 |
| 20 | MgBr$_2$ | EtOH | TiCl$_4$ | 14 | 221 |
| 21 | MgBr$_2$ | iPrOH | TiBr$_4$ | 14 | 194 |
| 22 | MgBr$_2$ | 3C$_8$H$_{17}$OH | TiCl$_4$ | 27 | 275 |
| 23 | MgBr$_2$ | $\frac{1}{2}$ C$_{12}$H$_{25}$OH | VCl$_4$ | 16 | 122 |
| 24 | MgI$_2$ | CH$_3$OH | TiCl$_4$ | 14 | 235 |
| 25 | MgI$_2$ | C$_2$H$_5$OH | Ti(OnBu)Cl$_3$ | 15 | 221 |
| 26 | MgI$_2$ | C$_8$H$_{17}$OH | Ti(OnBu)$_2$Cl$_2$ | 18 | 206 |
| 27 | MgI$_2$ | C$_{12}$H$_{25}$OH | TiBr$_4$ | 14 | 215 |

¹ Or less.

NOTE.—Et stands for an ethyl group; Bu, a butyl group; and Pr, a propyl group. These abbreviations have the same meanings hereinafter.

EXAMPLES 28–32

Ethylene was polymerized in the same manner as in Example 1 using various aluminum or zinc compounds indicated in Table 2 instead of the triisobutyl aluminum employed in Example 1. The results are shown in Table 2.

TABLE 2

| | Organometallic compounds | | Yield of polyethylene | | Melt index of polyethylene |
|---|---|---|---|---|---|
| | Kind | Amount (mmol) | G. | G./g. of the carrier-supported catalyst component | |
| Example: | | | | | |
| 28 | (C$_2$H$_5$)$_2$AlCl | 3 | 215 | 1,080 | 0.4 |
| 29 | (C$_2$H$_5$)$_2$AlBr | 3 | 208 | 1,040 | 0.4 |
| 30 | (C$_2$H$_5$)$_2$AlOC$_2$H$_5$ | 3 | 142 | 710 | 0.9 |
| 31 | C$_2$H$_5$Al.OC$_2$H$_5$.Cl | 3 | 158 | 790 | 0.7 |
| 32 | (C$_4$H$_9$)$_2$Zn | 3 | 186 | 930 | 0.5 |

EXAMPLE 33

Magnesium chloride (5 g.) having a composition of MgCl$_2$·½MeOH prepared in the same manner as in Example 1 was suspended in kerosense, followed by addition of 25 mmols of vanadium tetrachloride. While stirring, the suspension was heated to 130° C., and maintained at this temperature for one hour. The suspension was then filtered, and washed with refined hexane until there was no appreciable presence of chlorine in the washing liquid. The resultant solid carrier supported catalyst component contained a chlorine compound of vanadium equivalent to 21 mg. of vanadium fixed thereto. Ethylene was polymerized in the same manner as in Example 1 using 200 mg. of the carrier-supported catalyst component and 2 mmols of triethylaluminum. Some 213 g. of polyethylene having a molecular weight of 45,000 were obtained.

EXAMPLE 34

A 500 cc. flask was charged with 250 cc. of refined kerosene, and thoroughly purged with nitrogen. The carrier-supported catalyst component prepared in Example 1 (0.5 g.) and 2 mmols of triethyl aluminum were added, and the temperature was raised to 70° C. Ethylene was then added at atmospheric pressure and polymerized for 2 hours without the addition of hydrogen to give 72 g. of polyethylene having less than one methyl group per 1000 carbon atoms and having a molecular weight of 650,000.

EXAMPLE 35

Commercially available anhydrous manganese dichloride was calcined at 400° C. for 3 hours in a nitrogen stream. The infrared absorption spectrum of this heat-treated manganese chloride did not show the presence of absorption bands based on water of crystallization or hydroxyl groups. The manganese dichloride (12.6 g.) was added in a nitrogen atmosphere to a suspension of 50 mmols of absolute methanol in anhydrous hexane, and the mixture was heated for 30 minutes at 40° C., followed by drying under reduced pressure. The analysis of the resulting product showed that it had a composition $MnCl_2 \cdot \frac{1}{2}MeOH$. The infrared absorption spectrum of this compound clearly showed the presence of an absorption band of methanol, but an absorption band based on water of crystallization could not be seen.

This manganese chloride was suspended into titanium tetrachloride, and stirred for 1.5 hours at 110° C. Thereafter, the reacted suspension was filtered while being hot, and washed with refined hexane until there was no appreciable presence of chlorine, followed by drying. (All the foregoing operations were conducted in a nitrogen atmosphere.) The resultant carrier-supported catalyst component contained the chlorine compound of titanuim equivalent to 14 mg. of titanium per gram of the carrier. The absorption band based on methanol which had been observed before the reaction with the titanium tetrachloride completely disappeared after the reaction.

A 3-liter autoclave was charged with one liter of kerosene, 200 mg. of the so prepared carrier-supported catalyst component and 4 mmols of triisobutyl aluminum, and heated to 80° C. Hydrogen was introduced to a pressure of 3.5 kg./cm.$^2$, and ethylene gas was continuously fed while maintaining the total pressure at 7 kg./cm.$^2$. The polymerization of ethylene was performed for 2 hours to give 254 g. of a white polyethylene having a melt index of 2.6. The yield of the polyethylene corresponded to 1270 g. per gram of the carrier-supported catalyst component and 4380 g. per mmol of the titanium.

EXAMPLES 36 TO 64 AND COMPARATIVE EXAMPLES 4 AND 5

An anhydrous manganese halide was heated at 400° C. for 3 hours under a nitrogen stream, and then suspended into heptane, followed by addition of an alcohol. In the same manner as in Example 35, this alcohol-containing manganese halide was reacted with a transition metal halogen compound to thereby fix the transition metal halogen compound onto the carrier. Ethylene was polymerized under the same conditions as in Example 35 using 200 mg. of the so prepared carrier-supported catalyst component and an alkylaluminum or alkyl zinc of an amount indicated in Table 3. The results are also shown in Table 3.

TABLE 3

| | Manganese halide | Kind and mole of alcohol coordinated with one mole of manganese halide | Transition metal halogen compounds | | Organo-metallic compounds | Mmol | Yield of polyethylene (g.) |
|---|---|---|---|---|---|---|---|
| | | | Kind | Amount fixed (mg./g.) | | | |
| Comparative Example 4 | $MnCl_2$ | Not used | $TiCl_4$ | 0.2 | $Et_3Al$ | 3 | 1 |
| Example: | | | | | | | |
| 36 | $MnCl_2$ | $C_2H_5OH$ | $TiCl_4$ | 19 | $Et_2AlBr$ | 3 | 108 |
| 37 | $MnCl_2$ | $C_2H_5OH$ | $TiCl_4$ | 19 | $Et_{1.5}AlCl_{1.5}$ | 3 | 96 |
| 38 | $MnCl_2$ | $C_2H_5OH$ | $TiCl_4$ | 19 | $(EtO)AlEtCl$ | 3 | 72 |
| 39 | $MnCl_2$ | $C_2H_5OH$ | $TiCl_4$ | 19 | $Et_3Al$ | 3 | 268 |
| 40 | $MnCl_2$ | $C_2H_5OH$ | $TiCl_4$ | 19 | $Et_2Zn$ | 3 | 93 |
| 41 | $MnCl_2$ | $C_2H_5OH$ | $TiBr_4$ | 17 | $Et_3Al$ | 3 | 195 |
| 42 | $MnCl_2$ | $C_2H_5OH$ | $Ti(OEt)Cl_3$ | 18 | $Et_3Al$ | 3 | 197 |
| 43 | $MnCl_2$ | $C_2H_5OH$ | $Ti(OnBu)_2Cl_2$ | 17 | $Et_2AlCl$ | 4 | 88 |
| 44 | $MnCl_2$ | $C_2H_5OH$ | $VCl_4$ | 21 | $Et_3Al$ | 3 | 131 |
| 45 | $MnCl_2$ | $C_2H_5OH$ | $VOCl_3$ | 23 | $Et_2AlCl$ | 3 | 60 |
| Comparative Example 5 | $MnCl_2$ | $\frac{1}{1000} C_2H_5OH$ | $TiCl_4$ | 0.2 | $Et_3Al$ | 3 | 1 |
| Example: | | | | | | | |
| 46 | $MnCl_2$ | $\frac{1}{100} C_2H_5OH$ | $TiCl_4$ | 1.5 | $Et_3Al$ | 3 | 68 |
| 47 | $MnCl_2$ | $6C_2H_5OH$ | $TiCl_4$ | 20 | $Et_3Al$ | 3 | 186 |
| 48 | $MnCl_2$ | $\frac{1}{50}$ iPrOH | $TiCl_4$ | 5 | $Et_2AlBr$ | 3 | 112 |
| 49 | $MnCl_2$ | $C_6H_5CH_2OH$ | $TiCl_4$ | 14 | $Et_{1.5}AlCl_{1.5}$ | 3 | 94 |
| 50 | $MnCl_2$ | $CH_2=CHCH_2OH$ | $VCl_4$ | 19 | $(EtO)AlEtCl$ | 3 | 61 |
| 51 | $MnCl_2$ | $\frac{10}{10}$ nBuOH | $TiCl_4$ | 9 | $Et_2Zn$ | 3 | 169 |
| 52 | $MnCl_2$ | $nC_8H_{17}OH$ | $TiBr_4$ | 16 | $Et_3Al$ | 3 | 187 |
| 53 | $MnCl_2$ | $C_{12}H_{25}OH$ | $TiCl_4$ | 15 | $iBu_3Al$ | 3 | 195 |
| 54 | $MnCl_2$ | $C_{12}H_{25}OH$ | $Ti(OBu)Cl_3$ | 19 | $Et_2AlCl$ | 3 | 93 |
| 55 | $MnBr_2$ | $CH_3OH$ | $TiCl_4$ | 12 | $Et_3Al$ | 3 | 195 |
| 56 | $MnBr_2$ | $6CH_3OH$ | $TiCl_4$ | 32 | $iBu_3Al$ | 3 | 296 |
| 57 | $MnBr_2$ | $C_2H_5OH$ | $TiBr_4$ | 13 | $Et_2AlBr$ | 3 | 90 |
| 58 | $MnBr_2$ | $2C_2H_5OH$ | $VCl_4$ | 22 | $Et_{1.5}AlCl_{1.5}$ | 3 | 72 |
| 59 | $MnBr_2$ | $\frac{1}{10} nC_{12}H_{25}OH$ | $(EtO)TiCl_3$ | 4 | $Et_2Zn$ | 3 | 52 |
| 60 | $MnBr_2$ | $nC_{12}H_{25}OH$ | $VOCl_3$ | 21 | $(EtO)AlEtCl$ | 3 | 48 |
| 61 | $MnI_2$ | $\frac{1}{2} CH_3OH$ | $TiBr_4$ | 9 | $iBu_3Al$ | 3 | 160 |
| 62 | $MnI_2$ | $n-C_6H_{13}OH$ | $TiCl_4$ | 14 | $Et_2AlCl$ | 3 | 82 |
| 63 | $MnI_2$ | $n-C_8H_{17}OH$ | $Ti(OEt)Cl_3$ | 13 | $Et_3Al$ | 3 | 177 |
| 64 | $MnI_2$ | $n-C_8H_{17}OH$ | $VOCl_3$ | 21 | $Et_2Zn$ | 3 | 37 |

EXAMPLE 65

A 500 cc. flask was charged with 250 cc. of refined kerosene, and then thoroughly purged with nitrogen. The carrier-supported catalyst component (0.5 g.) prepared in Example 35 and 2 mmols of triethyl aluminum were added, and the temperature was raised to 70° C. Ethylene was added at atmospheric pressure without adding hydrogen, and the polymerization of ethylene was performed for 2 hours to give 82 g. of polyethylene having a bulk density of 0.27, a molecular weight of 720,000 and less than one methyl group per 1000 carbon atoms.

EXAMPLE 66

Commercially available anhydrous magnesium chloride was pulverized in a nitrogen atmosphere, and dried while passing a nitrogen stream for 2 hours at 600° C. This magnesium chloride (9.5 g.–100 mmols) was suspended into 40 cc. of anhydrous hexane, and while stirring 50 mmols of dried and refined methyl acetate were added. After refluxing for one hour, hexane was removed by heating in vacuo. The infrared absorption spectrum of the obtained solid indicated that there was an absorption band of carbonyl shifted to 1705 cm.$^{-1}$ (red shift), as compared with an absorption band of free methyl acetate at 1742 cm.$^{-1}$, and it was confirmed that methyl actate was coordinated with magnesium chloride. Furthermore, the elemental analysis indicated that it has a composition $MgCl_2 \cdot \frac{1}{2}CH_3COOCH_3$. Five grams of magnesium chloride pre-treated with methyl acetate were suspended into 40 cc. of titanium tetrachloride, and they were reacted for one hour at 130° C. The reaction product was filtered while the reaction system was still hot to thereby separate a solid portion. The filtrate was cooled and there yellow crystals which were confirmed by the infrared absorption spectrum a complex of titanium tetrachloride and methyl acetate were obtained. The solid portion was thoroughly washed with anhydrous hexane and then dried to remove the contained hexane. The infrared absorption spectrum of the so obtained solid compound did not at all show the presence of an absorption band based on methyl acetate. The chemical determination of titanium showed that this solid compound fixed the chlorine compound of titanium equivalent to 18 mg. of titanium per gram thereof.

A 2-liter autoclave was charged with one liter of refined kerosene, 3 mmols of triethyl aluminum, and 150 mg. of said solid compound, and heated to 90° C. Hydrogen was added to a pressure of 3.5 kg./cm.$^2$, and ethylene was introduced continuously while maintaining the total pressure at 7 kg./cm.$^2$. The polymerization of ethylene was carried out for 2 hours to give 278 g. of polyethylene having a melt index of 9. The obtained polyethylene was white even without further treatment with an alcohol, for instance. The yield of the polyethylene corresponds to 1850 g. per gram of the carrier-supported catalyst component and 4930 g. per mmol of titanium.

This polyethylene had 0.11% of an ash content. The ash content was reduced to 0.005% by suspending the polyethylene into methanol and heating it for 30 minutes at 90° C. When the polyethylene is used for applications where the ash content gives adverse effects, the ash may be removed easily by the post-treatment.

COMPARATIVE EXAMPLE 6

Five grams of magnesium chloride prepared in Example 66, without coordination of methyl acetate, were suspended in 30 cc. of titanium tetrachloride, and the suspension was heated for one hour at 130° C. A solid portion was separated by filtration, and washed thoroughly with refined hexane to remove free titanium tetrachloride. The solid portion did not contain fixed thereon a titanium compound of an amount detectable by a chemical analysis. Using this solid portion and triethyl aluminium, ethylene was subjected to polymerization in the same manner as in Example 66, but polyethylene was not formed.

COMPARATIVE EXAMPLES 7 TO 9

Using titanium tetrachloride and triethyl aluminium at the same titanium and aluminum concentrations as in Example 66, ethylene was polymerized under the same conditions as in Example 66 except that anhydrous magnesium chloride as the carrier was not used (Comparative Example 7); a pre-treatment reaction for supporting on the carrier was not carried out, but anhydrous magnesium chloride, titanium tetrachloride and triethyl aluminum were merely caused to be present conjointly (Comparative Example 8); and that 0.79 mmol (the same amount as employed in Example 66) of methyl acetate was caused to be present conjointly. The results are given in Table 4.

TABLE 4

| Comparative Example: | Yield of polyethylene (g.) |
|---|---|
| 7 | 4.4 |
| 8 | 5.2 |
| 9 | 4.6 |

COMPARATIVE EXAMPLE 10

The same anhydrous magnesium chloride (9.5 g.) as used in Example 66 was suspended into 80 cc. of titanium tetrachloride. Without prior coordination with the magnesium chloride, 50 mmols of methyl acetate was added to this system and a solid catalyst component was prepared in the same manner as in Example 66. The titanium compound equivalent to only 0.3 mg. of titanium per gram of the carrier-supported catalyst component was fixed. Ethylene was polymerized using 150 mg. of this catalyst and 3 mmols of triethyl aluminum under the same conditions as in Example 66. Only 8 g. of polyethylene were obtained.

COMPARATIVE EXAMPLE 11

One gram of magnesium chloride prepared in Example 66 was suspended in 5 cc. of hexane, and 0.2 mmol of triethyl aluminum was added. The system was stirred for one hour at room temperature, and hexane was removed under vacuum. Titanium tetrachloride (5 cc.) was added, and the mixture was heated for 30 minutes at 130° C. while stirring. The reaction product was filtered to separate a solid portion. Free titanium tetrachloride was washed with refined hexane. The titanium compound equivalent to 29 mg. of titanium per gram of the dried carrier-supported catalyst component was fixed. Using 150 mg. of this catalyst and 3 mmols of triethyl aluminum, ethylene was polymerized under the same conditions as in Example 66. Only 23 g. of polyethylene having a melt index of 0.01 were obtained. The yield corresponds to 150 g. per gram of the carrier-supported catalyst component and 260 g. per mmol of titanium.

COMPARATIVE EXAMPLE 12

Commercially available magnesium chloride hexahydrate ($MgCl_2 \cdot 6H_2O$) was placed in quartz tube, and heated in an electric oven. It began to melt at a temperature in the vicinity of 110° C. Heating was continued with the electric oven maintained at 280° C. A great quantity of hydrochloric acid was generated, and then a solidified mass of magnesium hydroxychloride was formed. The solid mass was further heated at 280° C. for 5 hours, and then pulverized. Five grams of the pulverized solid mass was suspended into 40 cc. of titanium tetrachloride, and stirred for 1.5 hours at 135° C. A solid portion was separated by filtration, and free titanium tetrachloride was removed with refined hexane. It was found that the titanium compound equivalent to 6 mg. of titanium was fixed per gram of this solid. Ethylene was polymerized under the same conditions as in Example 66 using 150 mg. of this solid catalyst component and 3 mmols of triethyl aluminum. Some 125 g. of polyethylene having a molecular weight of 60,000 were obtained. The yield corresponds to 830 g. per gram of the carrier-supported catalyst component and 6640 g. per mmol of titanium. This catalyst gave as high a yield of polyethylene based on the transition metal as in the case of using a catalyst within the scope of the invention, but as the yield of polyethylene based on the carrier-supported catalyst component was low, an ash content of the final polyethylene reached 0.25%.

The polyethylene was suspended into methanol to post-treat it at 90° C. The ash content was 0.13% even after the completion of the post-treatment. The magnesium hydroxychloride was insoluble in water or alcohol, and most of the components removed by the post-treatment was the aluminum component. Hence, when this carrier is used, the clogging of a screen pack at the time of pelletizing, the rust of a mold at the time of molding, or the fish eye of polyethylene occur, and it is impossible to produce a polymer which is fully satisfactory when used in applications in which the ash content is of a great concern.

COMPARATIVE EXAMPLE 13

In the same way as in Example 66, 5 g. of anhydrous magnesium acetate were reacted with 40 cc. of titanium tetrachloride. The titanium compound equivalent to 6 mg. of titanium per gram of the carrier was fixed. Ethylene was polymerized under the same conditions as in Example 66 using 150 mg. of this carrier-supported catalyst component and 3 mmols of triethyl aluminium. Only 64 g. of polyethylene having a bulk density of 0.10 were obtained. The yield corresponds to only 430 g. per gram of the carrier-supported catalyst component.

EXAMPLE 67

Anhydrous manganese chloride was dried for 2 hours at 500° C. in a nitrogen stream. One mol of this anhydrous manganese chloride was suspended into 50 cc. of dried hexane. On addition of 1 mol of ethyl acetate, the system was refluxed for one hour. The infrared absorption spectrum of the pre-treated solid compound free of hexane indicated the presence of a shifted absorption band based on the coordinated ethyl acetate. Five grams of this solid compound was suspended into 50 cc. of n-butoxy titanium trichloride, and heated at 135° C. for one hour. After the completion of pre-treatment reaction, a solid portion was separated by filtration, followed by thorough washing with refined hexane to remove free n-butoxy titanium trichloride, and drying. The titanium compound equivalent to 17 mg. of titanium per gram of this solid portion were fixed. The infrared absorption spectrum of this solid did not indicate the presence of an absorption band based on ethyl acetate.

Ethylene was polymerized under the same conditions as in Example 66 using 150 mg. of the above-mentioned carrier-supported catalyst component and 3 mmols of triethyl aluminum. Some 225 g. of polyethylene having a melt index of 4 were obtained.

EXAMPLES 68 TO 194 AND COMPARATIVE EXAMPLES 14 TO 19

In the same manner as in Example 66, various metal halides were pre-treated with esters, organic acids and amines, followed by reaction with transition metal halogen compounds to prepare catalyst components supporting the transition metal halogen compounds. Ethylene was polymerized in the same way as in Example 66 using the so prepared catalyst components and triethyl aluminum. The results are given in Table 5.

TABLE 5

| | Magnesium halide | Mole of electron donor used to pre-treat one mole of magnesium halide | Transition metal halogen compounds Kind | Amount fixed (mg. per gram of the supported catalyst) | Yield of polyethylene (g.) |
|---|---|---|---|---|---|
| Example: | | | | | |
| 68 | $MgCl_2$ | $\frac{1}{2}$ $HCOOCH_3$ | $TiCl_4$ | 10 | 195 |
| 69 | $MgCl_2$ | $\frac{1}{2}$ $HCOOCH_3$ | $TiBr_4$ | 12 | 192 |
| Comparative Example 14 | $MgCl_2$ | $\frac{1}{1000}$ $CH_3COOC_2H_5$ | $TiCl_4$ | 0.2 | 3 |
| Example: | | | | | |
| 70 | $MgCl_2$ | $\frac{1}{100}$ $CH_3COOC_2H_5$ | $TiCl_4$ | 1 | 49 |
| 71 | $MgCl_2$ | $CH_3COOC_2H_5$ | $TiCl_4$ | 21 | 261 |
| 72 | $MgCl_2$ | $CH_3COOC_2H_5$ | $TiBr_4$ | 20 | 182 |
| 73 | $MgCl_2$ | $CH_3COOC_2H_5$ | $Ti(OEt)Cl_3$ | 19 | 209 |
| 74 | $MgCl_2$ | $CH_3COOC_2H_5$ | $Ti(OnBu)_2Cl_2$ | 21 | 177 |
| 75 | $MgCl_2$ | $CH_3COOC_2H_5$ | $VCl_4$ | 23 | 138 |
| 76 | $MgCl_2$ | $CH_3COOC_2H_5$ | $VOCl_3$ | 22 | 125 |
| 77 | $MgCl_2$ | $6CH_3COOC_2H_5$ | $TiCl_4$ | 24 | 257 |
| 78 | $MgCl_2$ | $\frac{4}{3}$ $C_2H_5COOC_4H_9$ | $TiCl_4$ | 21 | 267 |
| 79 | $MgCl_2$ | $\frac{1}{2}$ $CCl_3COOC_2H_5$ | $TiCl_4$ | 16 | 213 |
| 80 | $MgCl_2$ | $CCl_3COOC_2H_5$ | $Ti(OEt)Cl_3$ | 19 | 195 |
| 81 | $MgCl_2$ | $HCOOC_{12}H_{25}$ | $TiCl_4$ | 17 | 190 |
| 82 | $MgCl_2$ | $HCOOC_{12}H_{25}$ | $VCl_4$ | 21 | 141 |
| 83 | $MgCl_2$ | $CH_2=CH(CH_2)_8COOC_2H_5$ | $TiCl_4$ | 19 | 203 |
| 84 | $MgCl_2$ | $C_{12}H_{25}COOCH_3$ | $TiCl_4$ | 19 | 191 |
| 85 | $MgCl_2$ | $C_{12}H_{25}COOCH_3$ | $Ti(OEt)Cl_3$ | 18 | 188 |
| 86 | $MgCl_2$ | $C_{12}H_{25}COOCH_2CH=CH_2$ | $TiCl_4$ | 18 | 179 |
| 87 | $MgCl_2$ | $C_{12}H_{25}COOCH_2CH=CH_2$ | $VCl_4$ | 24 | 138 |
| 88 | $MgCl_2$ | $C_{12}H_{25}COOC_{12}H_{25}$ | $TiCl_4$ | 18 | 198 |
| 89 | $MgCl_2$ | $C_{12}H_{25}COOC_{12}H_{25}$ | $VOCl_3$ | 23 | 136 |
| 90 | $MgCl_2$ | $\frac{1}{10}$ 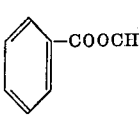—$COOCH_3$ | $TiCl_4$ | 4 | 157 |
| 91 | $MgCl_2$ | $\frac{1}{10}$ 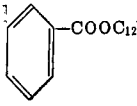—$COOC_{12}H_{25}$ | $TiCl_4$ | 4 | 155 |

TABLE 5—Continued

| | Magnesium halide | Mole of electron donor used to pre-treat one mole of magnesium halide | Transition metal halogen compounds Kind | Amount fixed (mg. per gram of the supported catalyst) | Yield of polyethylene (g.) |
|---|---|---|---|---|---|
| Example: | | | | | |
| 92 | $MgCl_2$ | $\frac{1}{10}$ $CH_3$-C$_6$H$_4$-COOCH$_3$ | $TiCl_4$ | 4 | 151 |
| 93 | $MgCl_2$ | $\frac{1}{10}$ $CH_3$-C$_6$H$_4$-COOC$_{12}$H$_{25}$ | $TiCl_4$ | 4 | 150 |
| 94 | $MgCl_2$ | $\frac{1}{10}$ C$_6$H$_4$(COOC$_8$H$_{17}$)$_2$ | $TiCl_4$ | 6 | 163 |
| 95 | $MgCl_2$ | $\frac{1}{3}$ $CH_3COOH$ | $TiCl_4$ | 10 | 125 |
| Comparative Example 15 | $MgCl_2$ | $\frac{1}{1000}$ $nC_3H_7COOH$ | $TiCl_4$ | ¹ 0.2 | 2 |
| Example: | | | | | |
| 96 | $MgCl_2$ | $\frac{1}{100}$ $nC_3H_7COOH$ | $TiCl_4$ | 1.5 | 38 |
| 97 | $MgCl_2$ | $\frac{1}{10}$ $n_3CH_7COOH$ | $TiCl_4$ | 4 | 127 |
| 98 | $MgCl_2$ | $nC_3H_7COOH$ | $TiCl_4$ | 18 | 203 |
| 99 | $MgCl_2$ | $nC_3H_7COOH$ | $TiBr_4$ | 20 | 178 |
| 100 | $MgCl_2$ | $nC_3H_7COOH$ | $Ti(OEt)Cl_3$ | 19 | 186 |
| 101 | $MgCl_2$ | $nC_3H_7COOH$ | $Ti(OnBu)_2Cl_2$ | 20 | 169 |
| 102 | $MgCl_2$ | $nC_3H_7COOH$ | $VCl_4$ | 22 | 144 |
| 103 | $MgCl_2$ | $nC_3H_7COOH$ | $VOCl_3$ | 23 | 141 |
| 104 | $MgCl_2$ | $6C_3H_7COOH$ | $TiCl_4$ | 51 | 285 |
| 105 | $MgCl_2$ | $CH_2=CH(CH_2)_8COOH$ | $Ti(OEt)Cl_3$ | 18 | 182 |
| 106 | $MgCl_2$ | $nC_{12}H_{25}COOH$ | $TiCl_4$ | 21 | 166 |
| 107 | $MgCl_2$ | $nC_{12}H_{25}COOH$ | $VCl_4$ | 18 | 134 |
| 108 | $MgCl_2$ | C$_6$H$_5$-COOH | $TiCl_4$ | 18 | 156 |
| 109 | $MgCl_2$ | $CH_3$-C$_6$H$_4$-COOH | $TiCl_4$ | 18 | 152 |
| 110 | $MgCl_2$ | C$_6$H$_4$(COOH)$_2$ | $TiCl_4$ | 17 | 142 |
| Comparative Example 16 | $MgCl_2$ | $\frac{1}{1000}$ $C_5H_5N$ | $TiCl_4$ | ¹ 0.2 | 1 |
| Example: | | | | | |
| 111 | $MgCl_2$ | $\frac{1}{100}$ $C_5H_5N$ | $TiCl_4$ | 1 | 29 |
| 112 | $MgCl_2$ | $\frac{1}{2}$ $C_5H_5N$ | $TiCl_4$ | 33 | 156 |
| 113 | $MgCl_2$ | $C_5H_5N$ | $TiBr_4$ | 25 | 136 |
| 114 | $MgCl_2$ | $C_5H_5N$ | $Ti(OEt)Cl_3$ | 20 | 124 |
| 115 | $MgCl_2$ | $C_5H_5N$ | $Ti(OnBu)_2Cl_2$ | 35 | 111 |
| 116 | $MgCl_2$ | $C_5H_5N$ | $VCl_4$ | 41 | 106 |
| 117 | $MgCl_2$ | $C_5H_5N$ | $VOCl_3$ | 44 | 92 |
| 118 | $MgCl_2$ | $6C_5H_5N$ | $TiCl_4$ | 48 | 146 |
| 119 | $MgCl_2$ | $\frac{1}{2}$ C$_5$H$_4$N-CH=CH$_2$ | $TiCl_4$ | 41 | 149 |
| 120 | $MgCl_2$ | $\frac{1}{2}$ Same as above | $TiBr_4$ | 37 | 140 |
| 121 | $MgCl_2$ | $\frac{1}{10}$ C$_6$H$_5$-NH$_2$ | $TiCl_4$ | 2 | 39 |
| 122 | $MgCl_2$ | $\frac{1}{10}$ $CH_3NH_2$ | $TiCl_4$ | 4 | 61 |

TABLE 5—Continued

| | Magnesium halide | Mole of electron donor used to pre-treat one mole of magnesium halide | Transition metal halogen compounds Kind | Amount fixed (mg. per gram of the supported catalyst) | Yield of polyethylene (g.) |
|---|---|---|---|---|---|
| Example: | | | | | |
| 123 | MgCl₂ | 1/10 CH₃NH₂ | TiBr₄ | 4 | 82 |
| 124 | MgCl₂ | 1/50 (C₄H₉)₃N | TiCl₄ | 1 | 24 |
| 125 | MgCl₂ | 1/50 C₈H₁₇NH₂ | TiCl₄ | 1 | 18 |
| 126 | MgCl₂ | 1/10 —NEt₂ | TiCl₄ | 2 | 30 |
| 127 | MgBr₂ | 1/4 CH₃COOCH₃ | TiCl₄ | 7 | 164 |
| 128 | MgBr₂ | C₁₂H₂₅COOCH₃ | TiBr₄ | 14 | 177 |
| 129 | MgBr₂ | CH₂=CHCOOCH₃ | Ti(OEt)Cl₃ | 15 | 195 |
| 130 | MgBr₂ | CH₃COOH | TiCl₄ | 13 | 180 |
| 131 | MgBr₂ | C₃H₇COOH | VOCl₃ | 18 | 148 |
| 132 | MgBr₂ | 1/2 C₅H₅N | TiCl₄ | 28 | 120 |
| 133 | MgI₂ | 1/5 CH₃COOCH₃ | TiCl₄ | 11 | 193 |
| 134 | MgI₂ | CH₃COOC₂H₅ | Ti(OEt)Cl₃ | 18 | 195 |
| 135 | MgI₂ | C₂H₅COOC₈H₁₇ | TiBr₄ | 17 | 188 |
| 136 | MgI₂ | CH₂=CHCOOCH₃ | VCl₄ | 18 | 144 |
| 137 | MgI₂ | C₅H₅N | TiCl₄ | 35 | 95 |
| 138 | MnCl₂ | HCOOCH₃ | TiCl₄ | 8 | 186 |
| 139 | MnCl₂ | HCOOCH₃ | TiBr₄ | 9 | 187 |
| Comparative Example 17 | MnCl₂ | 1/1000 CH₃COOC₂H₅ | TiCl₄ | 0.2 | 3 |
| Example: | | | | | |
| 140 | MnCl₂ | 1/100 CH₃COOC₂H₅ | TiCl₄ | 1 | 49 |
| 141 | MnCl₂ | CH₃COOC₂H₅ | TiCl₄ | 9 | 208 |
| 142 | MnCl₂ | CH₃COOC₂H₅ | TiBr₄ | 11 | 182 |
| 143 | MnCl₂ | CH₃COOC₂H₅ | Ti(OEt)Cl₃ | 10 | 185 |
| 144 | MnCl₂ | CH₃COOC₂H₅ | Ti(OnBu)₂Cl₂ | 11 | 180 |
| 145 | MnCl₂ | CH₃COOC₂H₅ | VCl₄ | 15 | 162 |
| 146 | MnCl₂ | CH₃COOC₂H₅ | VOCl₃ | 17 | 155 |
| 147 | MnCl₂ | 6CH₃COOC₂H₅ | TiCl₄ | 33 | 317 |
| 148 | MnCl₂ | CH₂=CHCOOCH₃ | TiCl₄ | 8 | 213 |
| 149 | MnCl₂ | CH₂=CHCOOCH₃ | VOCl₃ | 16 | 151 |
| 150 | MnCl₂ | CCl₃COOCH₃ | TiCl₄ | 9 | 195 |
| 151 | MnCl₂ | HCOOC₁₂H₂₅ | TiCl₄ | 11 | 201 |
| 152 | MnCl₂ | HCOOC₁₂H₂₅ | VCl₄ | 18 | 151 |
| 153 | MnCl₂ | C₁₂H₂₅COOCH₃ | TiCl₄ | 10 | 195 |
| 154 | MnCl₂ | C₁₂H₂₅COOCH₃ | VCl₄ | 18 | 154 |
| 155 | MnCl₂ | CH₃COOCH₂CH₂=CH₂ | TiCl₄ | 10 | 185 |
| 156 | MnCl₂ | C₁₂H₂₅COOC₁₂H₂₅ | TiCl₄ | 11 | 177 |
| 157 | MnCl₂ | 1/10 —COOCH₃ | TiCl₄ | 4 | 142 |
| 158 | MnCl₂ | 1/10 —COOC₁₂H₂₅ | TiCl₄ | 4 | 146 |
| Comparative Example: | | | | | |
| 18-1 | MnCl₂ | Not used | TiCl₄ | 0.1 | 1 |
| 18-2 | MnCl₂ | 1/1000 CH₃COOH | TiCl₄ | 0.2 | 2 |
| Example: | | | | | |
| 160 | MnCl₂ | 1/100 CH₃COOH | TiCl₄ | 1 | 41 |
| 161 | MnCl₂ | CH₃COOH | TiCl₄ | 15 | 189 |

TABLE 5—Continued

| | Magnesium halide | Mole of electron donor used to pre-treat one mole of magnesium halide | Transition metal halogen compounds Kind | Amount fixed (mg. per gram of the supported catalyst) | Yield of polyethylene (g.) |
|---|---|---|---|---|---|
| Example: | | | | | |
| 162 | MnCl₂ | CH₃COOH | TiBr₄ | 15 | 174 |
| 163 | MnCl₂ | CH₃COOH | Ti(EtO)Cl₃ | 16 | 177 |
| 164 | MnCl₂ | CH₃COOH | Ti(OnBu)₂Cl₂ | 15 | 178 |
| 165 | MnCl₂ | CH₃COOH | VCl₄ | 18 | 134 |
| 166 | MnCl₂ | CH₃COOH | VOCl₃ | 18 | 129 |
| 167 | MnCl₂ | CH₂=CHCOOH | TiCl₄ | 14 | 185 |
| 168 | MnCl₂ | nC₄H₉COOH | TiCl₄ | 15 | 183 |
| 169 | MnCl₂ | C₁₂H₂₅COOH | TiCl₄ | 16 | 186 |
| 170 | MnCl₂ | ⅕ C₆H₅-COOH | TiCl₄ | 4 | 136 |
| 171 | MnCl₂ | ⅕ CH₃-C₆H₄-COOH | TiCl₄ | 5 | 142 |
| 172 | MnCl₂ | ⅛ C₆H₄(COOH)₂ | TiCl₄ | 4 | 133 |
| Comparative Example 19 | MnCl₂ | 1/1000 C₅H₅N | TiCl₄ | 0.05 | 0 |
| Example: | | | | | |
| 173 | MnCl₂ | 1/100 C₅H₅N | TiCl₄ | 1 | 33 |
| 174 | MnCl₂ | ½ C₅H₅N | TiCl₄ | 34 | 145 |
| 175 | MnCl₂ | C₅H₅N | TiBr₄ | 30 | 121 |
| 176 | MnCl₂ | C₅H₅N | Ti(EtO)Cl₃ | 29 | 118 |
| 177 | MnCl₂ | C₅H₅N | Ti(OnBu)Cl₃ | 25 | 116 |
| 178 | MnCl₂ | C₅H₅N | VCl₄ | 35 | 69 |
| 179 | MnCl₂ | C₅H₅N | VOCl₃ | 37 | 76 |
| 180 | MnCl₂ | 6C₅H₅N | TiCl₄ | 42 | 153 |
| 181 | MnCl₂ | ½ C₅H₄N-CH=CH₂ | TiCl₄ | 35 | 135 |
| 182 | MnCl₂ | 1/10 C₆H₅-NH₂ | TiCl₄ | 2 | 33 |
| 183 | MnCl₂ | 1/10 C₆H₅-N(Et)₂ | TiCl₄ | 2 | 34 |
| 184 | MnCl₂ | 1/10 CH₃NH₂ | TiCl₄ | 1 | 20 |
| 185 | MnCl₂ | 1/10 (C₄H₉)₃N | TiCl₄ | 1 | 25 |
| 186 | MnCl₂ | 1/10 (C₈H₁₇)₂NH | TiCl₄ | 1 | 24 |
| 187 | MnBr₂ | HCOOCH₃ | TiCl₄ | 14 | 174 |
| 188 | MnBr₂ | CH₂=CHCOOCH₃ | Ti(OnBu)₂Cl₂ | 14 | 173 |
| 189 | MnBr₂ | C₄H₉COOC₈H₁₇ | TiBr₄ | 15 | 160 |
| 190 | MnBr₂ | CH₃COOH | TiCl₄ | 17 | 164 |
| 191 | MnBr₂ | C₅H₅N | TiCl₄ | 38 | 102 |
| 192 | MnI₂ | CH₃COOCH₃ | TiCl₄ | 14 | 181 |
| 193 | MnI₂ | CH₃COOH | TiCl₄ | 14 | 173 |
| 194 | MnI₂ | C₅H₅N | Ti(OEt)Cl₃ | 29 | 85 |

¹ Or less.

EXAMPLES 195 TO 214

Ethylene was polymerized under the same conditions as in Example 66 using the carrier-supported catalyst components prepared in Examples 66, 98, 112, 127, and 141, and various organoaluminum compounds or alkyl zinc instead of the triethyl aluminum used in Example 66. The results are given in Table 6.

formed polymer was filtered, and dried for a day in a vacuum drier. The yield of polypropylene was 128 g, pressure based on propylene monomer in the system. The yield of the resultant solid polypropylene was 217 g, and the residue of extraction with boiling n-heptane was 34%.

EXAMPLE 217

A 2-liter autoclave was charged with 500 ml. of refined kerosene, 3 mmols of triethyl aluminum and 500 mg. of the carrier-supported catalyst component prepared in Example 35. Propylene (200 g.) was added to this system, and polymerized for 2 hours at 50° C. At the end of the polymerization, unreacted propylene was removed by releasing the pressure. The resultant reaction product containing polypropylene was put into methanol, and stirred. The separated polymer was filtered, and dried for a day in a vacuum drier. The yield of polypropylene was 124 g., and the residue of extraction with boiling hexane was 40%.

EXAMPLES 218 TO 226

A 2-liter autoclave was charged with 1-liter of refined kerosene, 3 mmols of an alkyl aluminum compound and the carrier-supported catalyst component indicated in Table 7, and the system was heated to the temperature indicated in Table 7. Hydrogen was added to a pressure of 3.5 kg./cm.², and a gaseous mixture of ethylene and propylene (or ethylene and butene-1) containing 1.5 mol percent of propylene (or 0.8 mol percent of butene-1) was fed at the temperature indicated in Table 7, and the polymerization was effected for 2 hours while maintaining the total pressure at 10 kg./cm.² The results are given in Table 7.

TABLE 6

| Example | Metal halide | Preparation of supported catalyst | Organo-metallic compounds | Yield of polyethylene (g.) |
|---|---|---|---|---|
| 195 | MgCl₂ | Example 1 | Et₂AlBr | 168 |
| 196 | MgCl₂ | do | EtAlCl₂ | 130 |
| 197 | MgCl₂ | do | EtAl(OEt)Cl | 121 |
| 198 | MgCl₂ | do | iBu₃Al | 258 |
| 199 | MgCl₂ | do | Et₃Al₂Cl₃ | 146 |
| 200 | MgCl₂ | do | Et₂AlCl | 124 |
| 201 | MgCl₂ | Example 98 | Et₂Zn | 125 |
| 202 | MgCl₂ | do | Et₂AlCl | 88 |
| 203 | MgCl₂ | do | iBu₃Al | 197 |
| 204 | MgCl₂ | Example 112 | Et₂AlCl | 65 |
| 205 | MgBr₂ | Example 127 | Et₂AlBr | 81 |
| 206 | MnCl₂ | Example 141 | Et₂AlBr | 115 |
| 207 | MnCl₂ | do | EtAlCl₂ | 80 |
| 208 | MnCl₂ | do | EtAl(OEt)Cl | 73 |
| 209 | MnCl₂ | do | iBu₃Al | 186 |
| 210 | MnCl₂ | do | Et₃Al₂Cl₃ | 102 |
| 211 | MnCl₂ | do | Et₂Zn | 88 |
| 212 | MnCl₂ | Example 161 | Et₂AlCl | 95 |
| 213 | MnCl₂ | Example 174 | EtAlBr | 68 |
| 214 | MnBr₂ | Example 187 | EtAlCl | 87 |

EXAMPLE 215

A 2-liter autoclave was charged with 500 ml. of refined kerosene, 3 mmoles of triethyl aluminum and 280 mg. of the carrier-supported catalyst component prepared in Example 1. Propylene (150 g.) was introduced to this system, and polymerized for 2 hours at 50° C. At the end of the polymerization, unreacted propylene was removed under reduced pressure. The reaction product containing polypropylene was put into methanol and stirred. The formed polymer was filtered, and dried for a day in a vacuum drier. The yield of polypropylene was 128 g, and the residue of extraction with boiling hexane was 43%.

EXAMPLE 216

A one-liter autoclave was charged with 500 cc. of refined hexane, 2 mmols of triisobutyl aluminum, 400 mg. of the carrier-supported catalyst component prepared in Example 66, and 250 g. of propylene. The polymerization of propylene was performed for 2 hours while maintaining the system at 50° C. There was practically no partial

TABLE 7

| Example | Mixed gas | Preparation of supported catalyst | Electron donor | Metal halide (carrier) | Al compound (mmole) | Amount of supported catalyst | Polymerization temperature (%) | Yield of polymer (g.) | Per 1,000 carbon atoms | | Melt Index |
|---|---|---|---|---|---|---|---|---|---|---|---|
| 218 | Ethylene-propylene | Example 1 | CH₃COOCH₃ | MgCl₂ | 2 Et₃Al | 150 | 90 | 289 | 4 | Methyl group | 1.7 |
| 219 | Ethylene-butene-1 | do | do | MgCl₂ | 2 iBu₃Al | 150 | 90 | 255 | 2 | Ethyl group | 1.4 |
| 220 | Ethylene-propylene | Example 35 | CH₃OH | MnCl₂ | 2 Et₃Al | 150 | 70 | 386 | 4 | Methyl group | 1.8 |
| 221 | Ethylene-butene-1 | do | do | MnCl₂ | 3 Et₃Al | 150 | 70 | 354 | 3 | Ethyl group | 1.4 |
| 222 | Ethylene-propylene | Example 1 | CH₃OH | MgCl₂ | 3 Et₃Al | 150 | 70 | 274 | 4 | Methyl group | 2.1 |
| 223 | Ethylene-butene-1 | do | do | MgCl₂ | 3 Et₃Al | 150 | 70 | 269 | 3 | Ethyl group | 2.9 |
| 224 | Ethylene-propylene | Example 141 | CH₃COOC₂H₅ | MnCl₂ | 3 Et₂AlCl | 200 | 70 | 126 | 4 | Methyl group | 0.03 |
| 225 | Ethylene-butene-1 | Example 112 | Pyridine | MgCl₂ | 3 iBu₃Al | 200 | 90 | 156 | 2 | Ethyl group | 1.2 |
| 226 | Ethylene-propylene | Example 98 | CH₃COOH | MgCl₂ | 3 Et₂AlCl | 300 | 90 | 185 | 3 | Methyl group | 0.05 |

EXAMPLE 227

Anhydrous magnesium chloride (10 g.) calcined at 500° C. for one hour in a nitrogen stream was dissolved into 100 cc. of absolute ethanol, and the solution was added dropwise to 400 cc. of refined chlorobenzene heated at 100° C. The solution was stirred for 3 hours, and the remaining ethanol was removed as completely as possible in vacuo. The system was allowed to stand to precipitate the resulting finely divided solid particles. The supernatant liquid was removed by decantation. The precipitate was repeatedly washed with hexane, and after removal of hexane with a nitrogen stream, it was dried. The dried solid particles had an average diameter of 0.5 micron. Three grams of the dried solid particles were suspended into 30 cc. of titanium tetrachloride, and stirred for one hour at 120° C. At the end of the reaction, the system was filtered and washed thoroughly with refined hexane. The obtained solid portion was dried. It was found that the titanium halogen compound equivalent to 42 mg. of titanium was fixed per gram of the dried solid.

A 2-liter autoclave was charged with one liter of kerosene which had been sufficiently purged with nitrogen, 40 mg. of the abovementioned solid catalyst component, and 3 mmols of triisobutyl aluminum. The system was heated to 90° C. and hydrogen was introduced to a pressure of 3.5 kg./cm.$^2$. Ethylene was continuously added to be polymerized for 2 hours while maintaining the total pressure at 7 kg./cm.$^2$. Some 222 g. of polyethylene having a melt index of 8 were obtained. The yield corresponds to 5550 g. per gram of the solid catalyst component and 6340 g. per mmol of titanium.

EXAMPLES 228 TO 233

The carrier compound listed in Table 8 was dissolved in the alcohol indicated in Table 8. The precipitant shown in the table was put into a glass vessel, and the system was maintained at a temperature above the boiling point of the alcohol but below the boiling point of the precipitant.

An alcohol (concurrently acting as electron donor) solution of the carrier compound was added dropwise with vigorous stirring to the precipitant while the alcohol was continuously removed out of the system under reduced pressure to get a finely divided solid compound. The solid particles had an average diameter of about 0.5 micron. The finely divided solid particles were dried, and suspended into the transition metal halogen compound shown in Table 8, and stirred for one hour at 120° C. At the end of the reaction, a solid portion was separated by filtration and washed thoroughly with refined hexane, and dried. The so obtained carrier-supported catalyst component was combined with the organometallic compound shown in Table 8 to form a catalyst. Ethylene was polymerized in one liter of kerosene using the so obtained catalyst. The results are shown in Table 8.

EXAMPLE 234

The grams of various magnesium or manganese halides were each dissolved into various alcohols. Various precipitants (200 cc. each) were put into a glass vessel and maintained at a temperature above the boiling point of the alcohol but below the boiling point of the precipitant. An alcohol solution of the carrier was added dropwise with vigorous stirring. The alcohol was continuously removed from the system under reduced pressure, and finely divided solid particles were obtained. The solid particles were dried and reacted with each of the various transition metal halogen compounds (in the same manner as in Example 228 but at the temperature indicated in Table 9) given in Table 9 to thereby support the transition metal halogen compound thereon. Ethylene was polymerized in 1-liter of kerosene under various conditions shown in Table 9 using this carrier-supported catalyst component and 3 mmols of triisobutyl aluminum. The results are given in Table 9.

TABLE 8

| Example | Carrier | Alcohol | Precipitating solvent | Transition metal compound | Temperature at the time of supporting (°C.) | Amount fixed (Ti mg./g.) | Amount of supported catalyst (mg.) | Organometal compound Name | Organometal compound Amount (mm.) | H$_2$ (kg./cm.$^2$) | Total pressure (kg./cm.$^2$) | Temperature (°C.) | Time (hr.) | Polymer Yield (g.) | Polymer Yield (g.) per gram of the supported catalyst |
|---|---|---|---|---|---|---|---|---|---|---|---|---|---|---|---|
| 228 | MgCl$_2$ | Ethanol | Chlorobenzene | TiCl$_4$ | 120 | 42 | 40 | Et$_3$Al | 3 | 3.5 | 7 | 90 | 2 | 218 | 5,450 |
| 229 | MgCl$_2$ | do | do | TiCl$_4$ | 120 | 42 | 40 | Et$_2$AlBr | 3 | 3.5 | 7 | 90 | 2 | 146 | 3,650 |
| 230 | MgCl$_2$ | do | do | TiCl$_4$ | 120 | 42 | 40 | Et$_{1.5}$AlBr$_{1.5}$ | 3 | 3.5 | 7 | 90 | 2 | 94 | 2,350 |
| 231 | MgCl$_2$ | do | do | TiCl$_4$ | 120 | 42 | 40 | Et$_2$Al(OEt)Cl | 3 | 3.5 | 7 | 90 | 2 | 53 | 1,330 |
| 232 | MgCl$_2$ | do | do | TiCl$_4$ | 120 | 42 | 40 | Et$_2$Zn | 3 | 3.5 | 7 | 90 | 2 | 51 | 1,280 |
| 233 | MnCl$_2$ | do | do | TiCl$_4$ | 120 | 46 | 40 | iBu$_3$Al | 3 | 3.5 | 7 | 90 | 2 | 204 | 5,100 |

We claim:
1. A process for polymerizing or copolymerizing olefins in the presence of a catalyst comprising Ziegler-type catalyst components supported on inorganic solid particles and organo-metallic compounds, which process comprises polymerizing or copolymerizing said olefins in the presence of a catalyst comprising
   (a) a transition metal compound supported on inorganic solid particles, obtained by pre-treating solid particles of a dihalide of a divalent metal selected from the group consisting of magnesium, calcium, zinc, chromium, manganese, iron, cobalt and nickel with an electron donor selected from the group consisting of aliphatic carboxylic acids, aromatic carboxylic acids, alkyl esters of aliphatic carboxylic acids, alkyl esters of aromatic carboxylic acids, aliphatic ethers, cyclic ethers, aliphatic ketones, aromatic ketones, aliphatic aldehydes, aromatic aldehydes, aliphatic alcohols, aromatic alcohols, aliphatic acid halides, aliphatic nitriles, aromatic nitriles, aliphatic amines, aromatic amines, aliphatic phosphines and aromatic phosphines, said electron donor being liquid or gaseous under the pre-treating conditions, in a substantial absence of water, to prepare pre-treated solid particles of said divalent metal halide containing $10^{-2}$ to 6 mols of said electron donor per mol of said pre-treated solid particles and heating said pre-treated solid particles together with a halogen compound of a transition metal selected from the group consisting of tetravalent titanium, tetravalent vanadium and pentavalent vanadium, which compound is liquid under the heat-treatment conditions, to thereby bond said halogen compound to the surfaces of said pre-treated solid particles; and
   (b) an organometallic compound selected from the group consisting of organoaluminum compounds and alkyl zinc.

2. The process of claim 1 wherein said electron donor is a member selected from the group consisting of $C_2$–$C_{12}$ aliphatic ethers, $C_3$–$C_4$ cyclic ethers, $C_3$–$C_{13}$ aliphatic ketones, $C_7$–$C_{12}$ aromatic aldehydes, $C_2$–$C_{12}$ aliphatic nitriles, $C_1$–$C_{20}$ aliphatic amines and $C_6$–$C_{12}$ aromatic amines.

3. The process of claim 1 wherein said electron donor is a member selected from the group consisting of $C_3$–$C_4$ aliphatic ethers, $C_4$ cyclic mono- or di-ethers, $C_3$–$C_4$ aliphatic ketones, benzaldehyde, acetonitrile, $C_1$–$C_{16}$ aliphatic amines and $C_6$–$C_8$ aromatic amines.

4. The process of claim 1 wherein the pre-treatment with the electron donor is carried out by heating at a temperature from $-50°$ to $+300°$ C.

5. The process of claim 1 wherein the heat-treatment of the pre-treated solid particles and the transition metal halogen compound is effected at a temperature from 30 to 300° C.

6. The process of claim 1 wherein said electron donor is an aliphatic alcohol and said pre-treated solid particles are a precipitate formed by adding an organic precipitant selected from the group consisting of hydrocarbons and halogenated hydrocarbons incapable of dissolving said dihalide to a solution of said dihalide of a divalent metal in said aliphatic alcohol.

7. The process of claim 1 wherein said solid particles of said divalent metal dihalide have a particle size within the range of 0.05 to 70 microns.

8. A process of claim 7 wherein said particle size range is 0.1 to 30 microns, and at least 80% by weight of said solid particles consists of particles having a size within said range.

9. A process for polymerizing or copolymerizing olefins in the presence of a catalyst comprising Ziegler-type catalyst components supported on inorganic solid particles and organo-metallic compounds, which process comprises polymerizing or copolymerizing said olefins in the presence of a catalyst comprising (a) a transition metal compound supported on inorganic solid particles, obtained by pre-treating solid particles of a dihalide of a divalent metal selected from the group consisting of magnesium, calcium, zinc, chromium, manganese, iron, cobalt and nickel with an electron donor selected from the group consisting of (i) $C_4$–$C_{12}$ saturated or unsaturated aliphatic alcohols, (ii) $C_7$–$C_9$ aromatic alcohols, (iii) esters of $C_1$–$C_{13}$ saturated or unsaturated aliphatic carboxylic acids with $C_1$–$C_{12}$ saturated or unsaturated aliphatic alcohols, (iv) esters of substituted $C_1$–$C_{13}$ saturated or unsaturated aliphatic carboxylic acids with $C_1$–$C_{12}$ saturated or unsaturated alcohols wherein the substituent is a halogen atom, (v) esters of $C_7$–$C_{12}$ aromatic carboxylic acids with $C_1$–$C_{12}$ saturated or unsaturated aliphatic alcohols, (vi) esters of substituted $C_7$–$C_{12}$ aromatic carboxylic acids with $C_1$–$C_{12}$ saturated or unsaturated alcohols wherein the substituent is a lower alkyl group, (vii) $C_1$–$C_{15}$ saturated or unsaturated aliphatic carboxylic acids, (viii) $C_7$–$C_{12}$ aromatic carboxylic acids, (ix) $C_7$–$C_{12}$ aromatic carboxylic acids having a lower alkyl group attached to the aromatic nucleus, (x) pyridine and (xi) substituted pyridine wherein a substituent attached to a nuclear carbon atom is selected from vinyl and lower alkyl groups, said electron donor being liquid or gaseous under the pre-treating conditions, in a substantial absence of water, to prepare pre-treated solid particles of said divalent metal halide containing $10^{-2}$ to 6 mols of said electron donor per mol of said pre-treated solid particles, and heating said pre-treated solid particles together with a halogen compound of a transition metal selected from the group consisting of tetravalent titanium, tetravalent vanadium and pentavalent vanadium, which compound is liquid under the heat-treatment conditions, to thereby bond said halogen compound to the surfaces of said pre-treated solid particles; and, (b) an organometallic compound selected from the group consisting of organoaluminum compounds and alkyl zinc.

10. The process of claim 9 wherein said inorganic solid particles are selected from solid particles of magnesium and manganese dihalides.

11. The process of claim 9 wherein said inorganic solid particles are selected from solid particles of magnesium dichloride and manganese dichloride.

12. A process of claim 9 wherein said electron donor is a member selected from the group consisting of (i) $C_1$–$C_{12}$ saturated or unsaturated monohydric or polyhydric aliphatic alcohols, (ii) $C_7$ aromatic alcohol, (iii) esters of $C_1$–$C_{13}$ saturated or unsaturated aliphatic carboxylic acids with $C_1$–$C_{12}$ saturated or unsaturated monohydric or dihydric aliphatic alcohols, (iv) esters of substituted $C_1$–$C_{13}$ saturated or unsaturated aliphatic carboxylic acids with a $C_1$–$C_{12}$ saturated or unsaturated monohydric or dihydric aliphatic alcohols wherein the substituent is a halogen atom, (v) esters of $C_7$–$C_8$ monovalent or divalent aromatic carboxylic acids with $C_1$–$C_{12}$ saturated or unsaturated monohydric or dihydric aliphatic alcohols, (vi) esters of substituted $C_7$–$C_8$ monovalent or divalent aromatic carboxylic acids with $C_1$–$C_{12}$ saturated or unsaturated monohydric or dihydric aliphatic alcohols wherein the substituent is a lower alkyl group, (vii) $C_1$–$C_{13}$ saturated or unsaturated aliphatic carboxylic acids, (viii) $C_7$–$C_8$ monovalent or divalent aromatic carboxylic acids, (ix) $C_7$–$C_8$ monovalent or divalent aromatic carboxylic acids having a lower alkyl group attached to the aromatic nucleus, (x) pyridine, and (xi) substituted pyridine wherein the substituent attached to a nuclear carbon atom is selected from the group consisting of vinyl and lower alkyl groups.

References Cited
UNITED STATES PATENTS

| | | | |
|---|---|---|---|
| 2,881,156 | 4/1959 | Pilar et al. | 260—94.9 |
| 2,951,066 | 8/1960 | Coover et al. | 260—93.7 |
| 3,116,274 | 12/1963 | Boehm et al. | 260—94.9 |
| 3,238,146 | 3/1966 | Hewitt et al. | 260—93.7 |
| 3,317,499 | 5/1967 | Nakaguchi et al. | 260—93.7 |
| 3,328,366 | 6/1967 | Nakaguchi et al. | 260—94.9 |
| 3,380,981 | 4/1968 | Miller et al. | 260—93.7 |

FOREIGN PATENTS 6714024  4/1968  Netherlands.

JOSEPH L. SCHOFER, Primary Examiner

E. J. SMITH, Assistant Examiner

U.S. Cl. X.R.

252—429 B, 429 C; 260—93.7, 94.9 C, 94.9 E